United States Patent [19]
Mosley

[11] Patent Number: 5,915,706
[45] Date of Patent: Jun. 29, 1999

[54] WHEELBARROW WITH INTEGRATED TRAILERING AND DUMPING CAPABILITIES

[76] Inventor: Keith A. Mosley, 17 Dawn Pl., Jackson, Tenn. 38305

[21] Appl. No.: 08/718,992

[22] Filed: Sep. 24, 1996

[51] Int. Cl.⁶ .................................................. B62B 1/24
[52] U.S. Cl. .............................. 280/47.26; 280/47.315; 280/653
[58] Field of Search .................. 280/653, 655, 280/657, 415.1, 47.18, 47.2, 47.24, 47.26, 47.31, 47.32, 47.315; 298/3; 414/346, 350, 444, 445, 469, 490

[56] References Cited

U.S. PATENT DOCUMENTS

| | | | |
|---|---|---|---|
| 879,861 | 2/1908 | Ferguson | 298/3 |
| 1,202,601 | 10/1916 | Snyder | 298/3 |
| 2,579,077 | 12/1951 | Hubner | 280/47.18 |
| 4,417,765 | 11/1983 | Wirsbinski | 280/47.26 |
| 4,789,171 | 12/1988 | Porter | 280/47.26 |
| 5,087,061 | 2/1992 | Wallace | 280/653 |
| 5,149,116 | 9/1992 | Donze et al. | 280/47.31 |
| 5,372,376 | 12/1994 | Pharaoh | 298/3 |
| 5,615,902 | 4/1997 | Reurich | 280/47.18 |
| 5,758,887 | 6/1998 | Bobst | 280/47.24 |

FOREIGN PATENT DOCUMENTS

| | | | |
|---|---|---|---|
| 1017027 | 11/1952 | France | 298/3 |
| 85/01025 | 3/1985 | WIPO | 280/47.32 |

*Primary Examiner*—J. J. Swann
*Assistant Examiner*—Frank Vanaman

[57] ABSTRACT

A wheelbarrow specially adapted for selective manual or machine deployment. The preferred embodiment comprises a wheelbarrow having a generally conventional tub hingedly secured to a frame with a latching means opposite. The tubular handles and tongue are slideably adjustable for mode with the handles also rotatively adjustable for ergonomics. The two wheel axle placement towards the center of gravity allows for lighter handle and tongue loads, enabling wheelbarrow conversion to trailer and vice versa easily even in the fully loaded condition. Two embodiments of the wheelbarrow with integrated trailering and dumping capabilities are disclosed, one having single and the other having double pivoting tub dump mechanisms.

1 Claim, 5 Drawing Sheets

VIEW W OF FIG 2

VIEW X

POSITION 'H'

POSITION 'M'

POSITION 'L'

WHEELBARROW WITH INTEGRATED TRAILERING AND DUMPING CAPABILITIES

BACKGROUND OF THE INVENTION

1. Field

The present invention relates to wheelbarrows and, more particularly, to such wheelbarrows capable of both traditional operation as well as trailering behind riding mowers, all-terrain vehicles, and powered carts with a pivoting tub for dumping.

2. Description of the Prior Art

It is generally well known in the wheelbarrow and trailer industries that their respective equipment serve the manual and machine deployed load hauling needs of consumers. Some attempts to provide a wheelbarrow capable of conversion to trailering have been made, particularly as evidenced by the following U.S. Pat. Nos.: 4,740,008, issued Apr. 26, 1988 to Johnson and 5,087,061, issued Feb. 11, 1992 to Wallace.

In each of the above cited patents, wheelbarrows have been modified for trailering which compomises performance or convenience, or both. In particular, prior art wheelbarrow conversions have no dumping means in the trailering mode short of unhooking from their deployer; they have substantial handle or tongue loads in their respective modes due to the traditional axle placement; their conversion from trailering mode to manual mode or vica versa with a load in the tub cumbersome to difficult at best; and finally, they have non-adjustable width and height handles limiting ergonomic suitability. Accordingly, a need has been recognized for a wheelbarrow which may be easily and conveniently converted from manual to machine deployed, and which performs both functions in a superior manner.

BRIEF SUMMARY OF THE INVENTION

It is therefore an object of the present invention to provide a wheelbarrow which is easily convertible between manual and machine deployed functions, even in the loaded condition.

It is another object to provide a wheelbarrow that is ergonomically designed for lighter handle or tounge loads, which changes direction easily and has roved lateral stability.

It is another object to provide a wheelbarrow that is completely dumpable without disconnecting in the machine deployed load hauling mode, the tub being capable of up to and beyond 180 degrees of rotation.

In order to achieve these and other objectives, the present invention comprises a wheelbarrow having a generally conventional tub hingedly secured to a frame member opposite and latchably lockable to a frame member at the operator position. The tub has axially extendable and retractable tubular handles with thru holes pinable in slightly larger tubular supports, which are fixably attached to the tub. Handles are axially positionable for mode and rotatively positionable in the manual mode for height and width adjustment.

The wheelbarrow of this invention has a tubular frame member that serves as the tongue support and receiver. The tongue is pinable to this frame member and and adjustable axially for mode.

Additional objects and advantages of this invention will become apparent upon reading the attached detailed description and upon reference to the appended drawings.

DETAILED DESCRIPTION OF THE PREFERRED EMBODIMENTS

Figure 1:
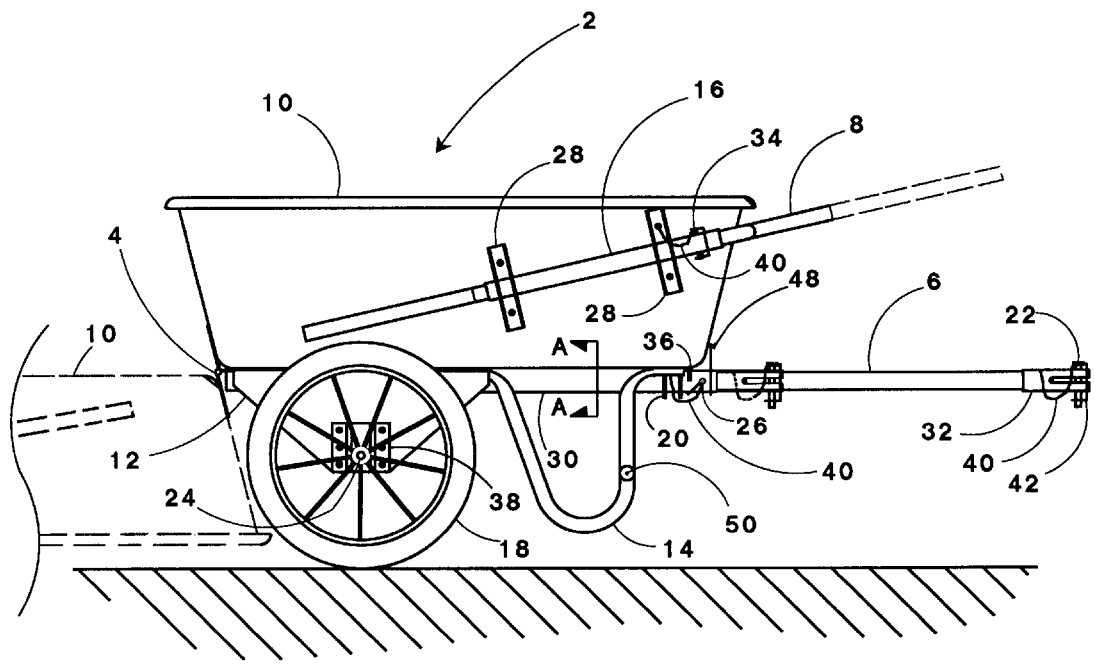
FIG. 1 is a side view of the wheelbarrow of the present invention converted to the trailering mode. This figure shows a portion of the tub in phantom for the preferred embodiment in the dumping position. The manually deployed mode is depicted by phantom positions of the handle and tongue.

FIG. 1 shows the trailering or machine deployed mode of the current invention, adjustable tubular handles 8 and tongue 6 pinned in their respective positions 34 and 26. The tub 10 of wheelbarrow 2 is symmetrical with inclined planar walls joined by variably radiused transitions. A return flange is formed around the upper rim to give the tub 10 rigidity and strength.

Figure 2:
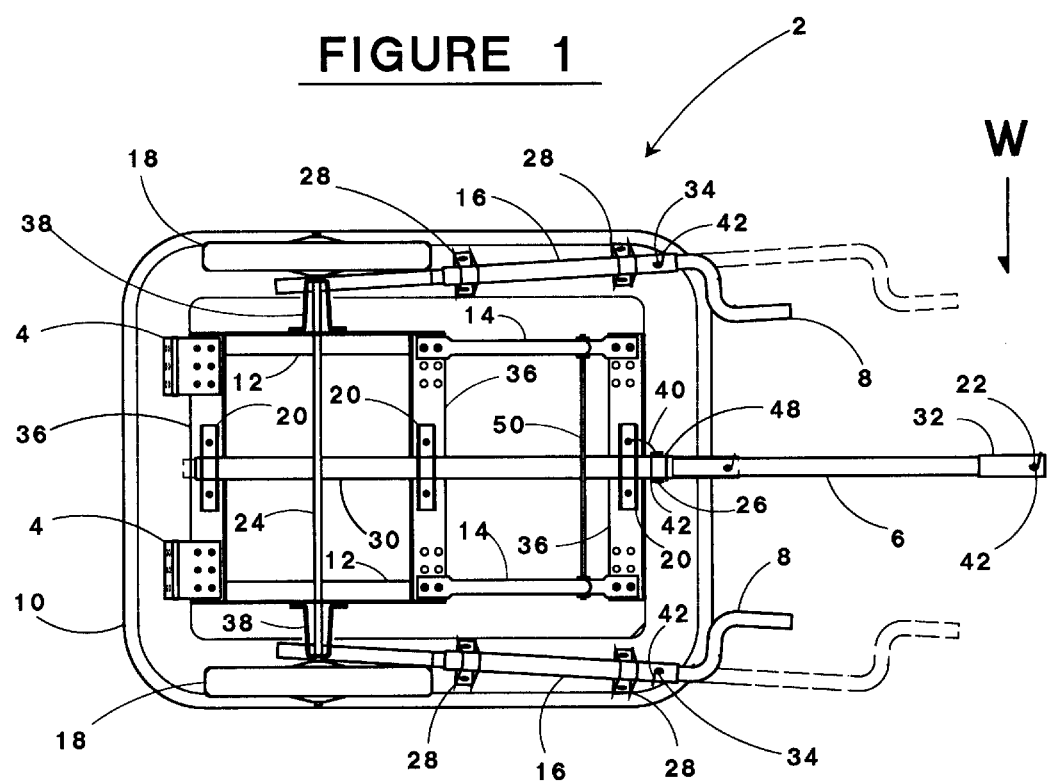
FIG. 2 is a bottom view of the present invention with the manual handle and tongue positions shown in phantom.
Figure 3:
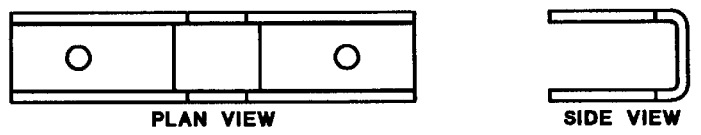
FIG. 3 shows the plan, front and side views of the tube clamp.
Figure 3:
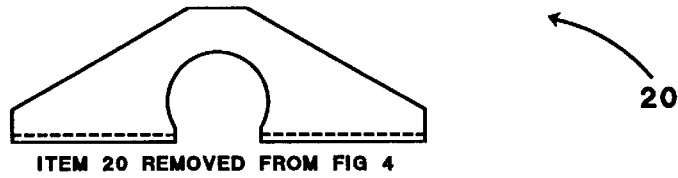
Figure 11:
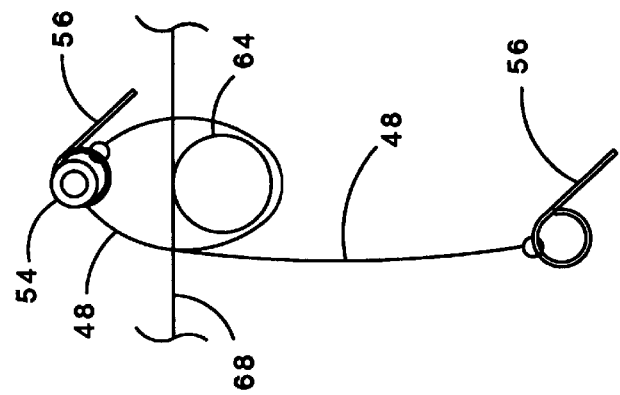
FIG. 11 shows the latch configuration of either embodiment from the operator end with the released latch position in phantom.

The phantom position of the tub 10 in FIG. 1 shows the 180 degree rotation capability. This is accomplished with hinges 4 located at the front of the axle brackets 12 once the wireform 56 shown in FIG. 11 is released. The hinges 4 are attached to the tub 10 and the front tub support 36 as is shown in FIGS. 1 and 2. The latching arrangement pictured in FIG. 11 consists of a lanyard 48 attached to a headed stud 54 and wireform 56.

The phantom positions in FIGS. 1 and 2 of the handles 8 and the tongue adapter 32 show the manually deployed mode of the current invention. These positions are also pinnable 34 and 26 to lock conversion.

Figure 4:
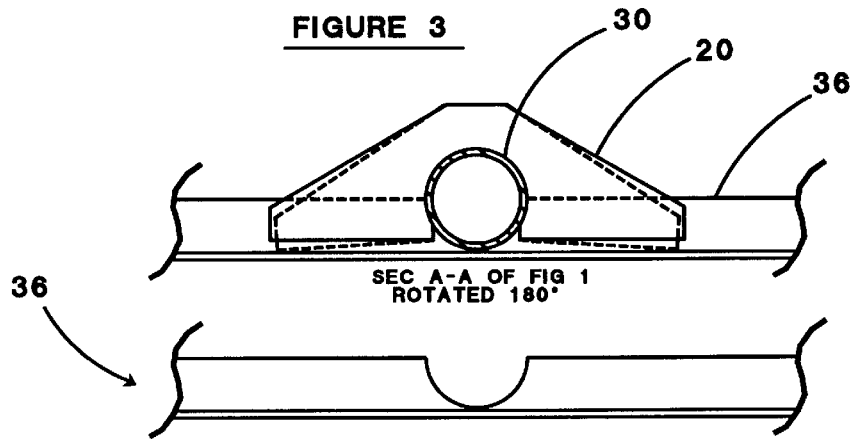
FIG. 4 demonstrates the tube clamp principle.
Figure 5:
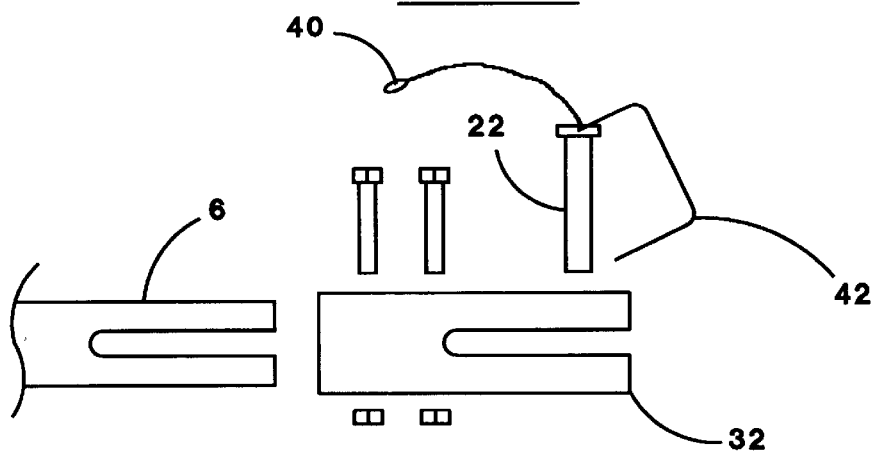
FIG. 5 is a side exploded view of the tongue adapter.
Figure 6:
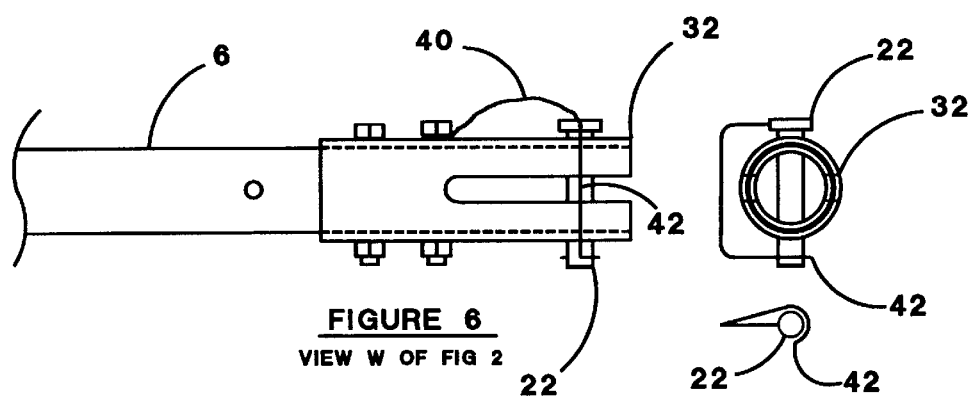
FIG. 6 shows the tongue adapter and pinning concept.

The tubular handle supports 16 and tube frame 30 in FIGS. 1 and 2 are affixed via tube clamps 28 and 20 respectively. By bringing the clamps into a flat surface and securing by welding or fastening, the tubes resists rotation or axial displacement as is shown in FIG. 4. The tongue adapter 32 not only adds strength to the hitching area of the tongue 6 but provides a positive stop against the tube frame 30 automatically aligning 6 and 30 to be pinned 26, as can be seen in FIGS. 1, 2 and 6.

As in FIG. 1 the axle 24 for the preferred embodiment is positioned more toward the center of gravity of the tub 10, but not centered so that the tongue 6 or handle 8 loads are less and there is normal resting forces on the skids 14 when parking a load manually. The skids 14 attach to the middle and rear tub supports 36 and the tube frame 30 attaches to the front, middle and rear tub supports 36 as is seen in FIG. 2.

Large diameter wheels 18 with integrated bearings are affixed to the ends of axle rod 24 which is supported by cross holes in the axle brackets 12. A brace 38 is utilized to stabilize this area for increased load carrying capability. The axle brackets 12 interface with the front and middle tub supports 36 and portions of the skids 14 and hinges 4 as is shown in FIG. 2. A stabilizer rod 50 is placed between the skids 14 to improve durability and load holding capability.

Figure 7:
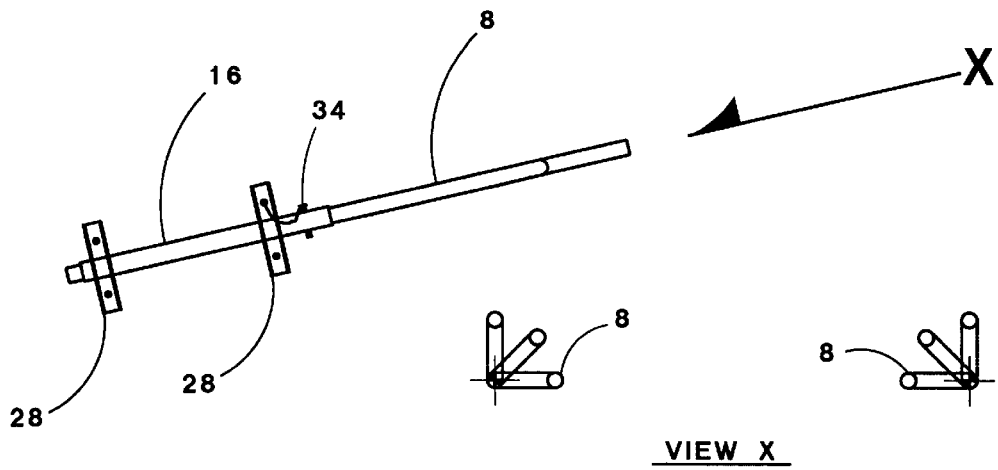
FIG. 7 is a side view of the handle support and adjustment system.
Figure 8:
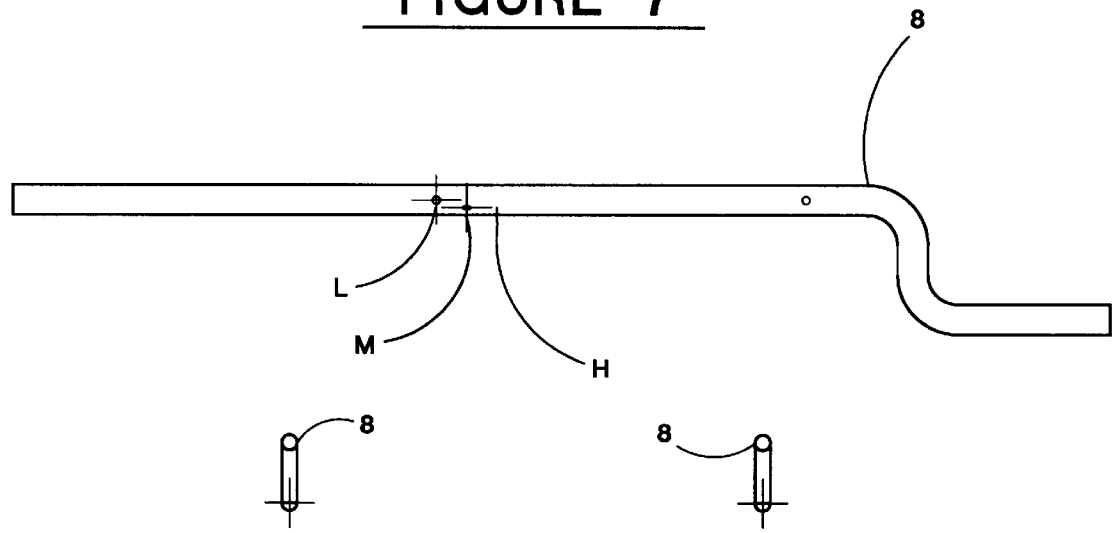
FIG. 8 shows the three hole adjustment pattern of the handle with its respective end view handle positions.

In order to adjust to different size users in the manual mode, the handles 8 rotate presenting different width and elevation settings that are pinnable 34, as is demonstrated in FIGS. 7 and 8. Position 'L' shows the handles in the narrowest and lowest position for smaller users. Position 'M' shows the nominal or average position that will accomodate most users. Postion 'H' demonstrates the widest and highest position for users of larger stature.

The tongue 6 and handles 8 are secured in their required positions by pining thru the associated tube frame 30 and handle support 16 as can be seen in FIGS. 1 and 2. The pins 22, 26 and 34 are tethered by lanyards 40 so they can not be lost and have latching features 42 so that they will stay in place as shown in FIGS. 1 and 6.

Figure 9:
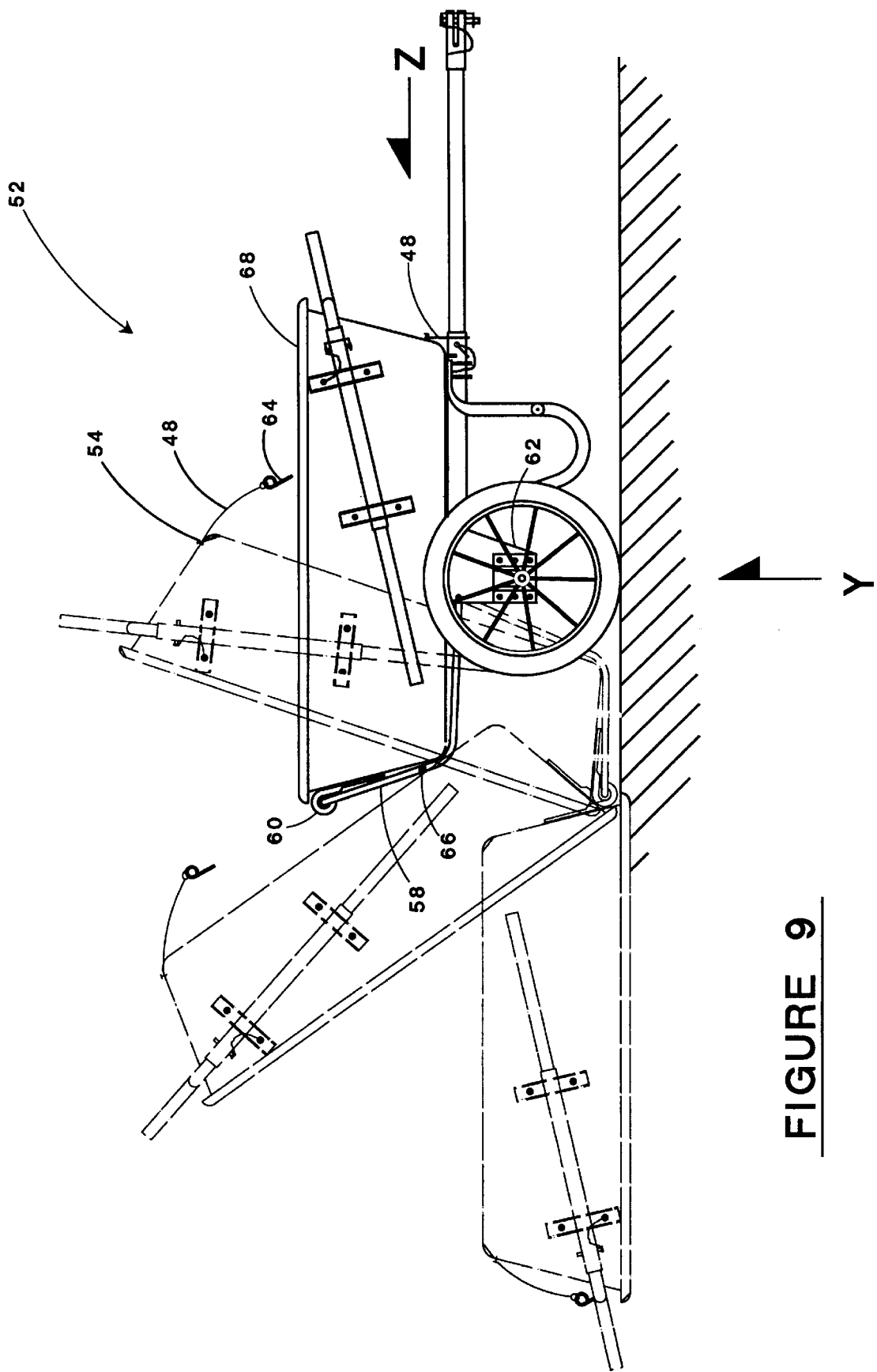
FIG. 9 shows an alternate embodiment for the tub dumping mechanism.
Figure 10:
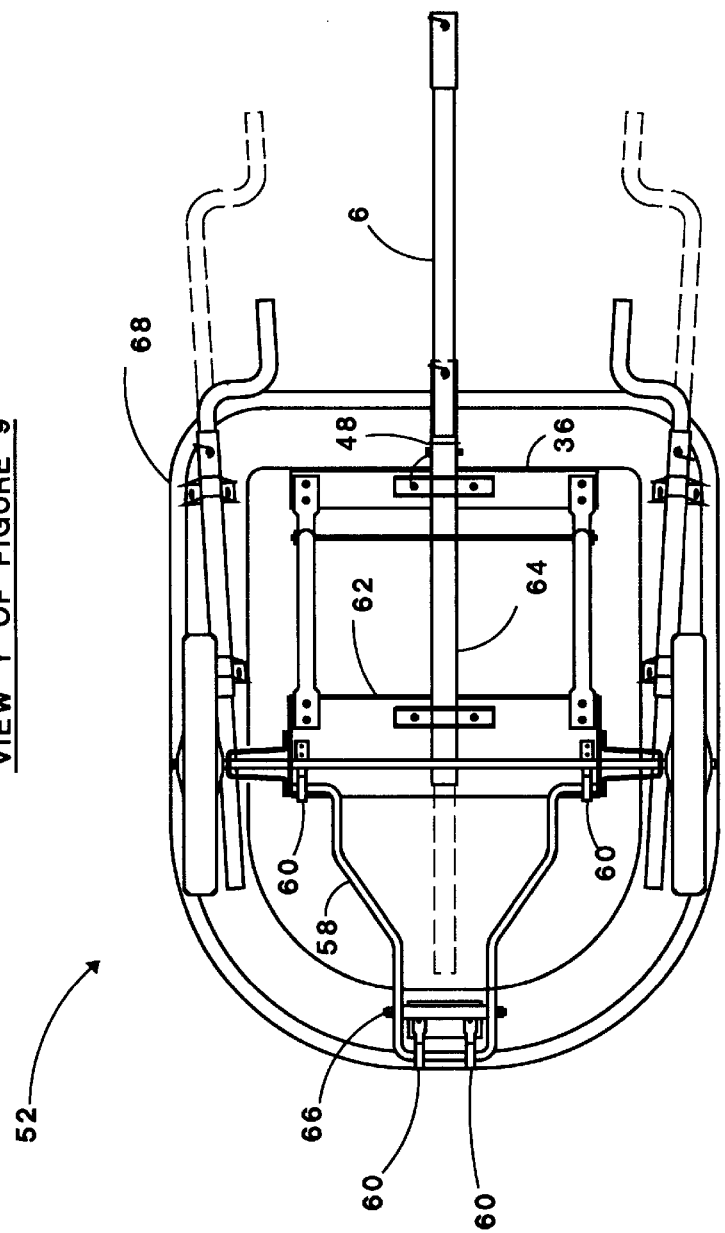
FIG. 10 is a bottom view of the alternate embodiment showing the manual handle and tongue positions in phantom.

The alternate embodiment in FIGS. 9 and 10 shows a wheelbarrow 52 of the same arrangement as before except that it has a dual pivot dumping action that reduces the effort required to tilt the tub 68. This allows the load to shift more rapidly lightening the handle 8 loads progressively as the tub 68 rotates upwardly about the first pivot and is accomplished about the open end of frame extension 58, said open ends secured by pivot anchors 60 and an axle bracket 62. Once the pivot anchors 60 and closed end of frame extension 58 contact the ground the tub 68 begins to rotate about the closed end of frame extension 58 carrying and dispersing the load away from the body of the wheelbarrow 52. A stabilizer 66 is positioned midway between ends of the frame extension 58 to maintain integrity of form. This action also allows for a complete 180 degree dump eliminating the need for raking or otherwise dragging the last of the load from the tub, as is required by small tilt trailers of prior art.

The tub 68 of the alternate embodiment has a mostly semi-circular front wall as can be seen in FIG. 10 to aid in centralizing the load.

An abbreviated tube frame 64 in the alternate embodiment provides clearance for the first pivot action in the trailering mode while the tongue 6 lends support for the tub 68 in the manual mode as is shown in phantom in FIG. 10. The skids 14 attach to the axle bracket 62 and rear tub support 36.

While the principles of a wheelbarrow with integrated trailering and dumping capabilities are disclosed herein, it will be apparent to those skilled in the art that many modifications of the embodiments disclosed herein may be made without departing from the spirit and scope of this patent. Accordingly, the coverage provided by this patent is to be limited only by the following claims.

What is claimed is:

1. A wheelbarrow comprising:

a frame having a front portion to which is mounted a first hinge portion, a rearward portion, and a lower portion to which is mounted a pair of wheels;

said frame having a towing tongue which is selectively longitudinally extensible beyond a rearward extent of said wheelbarrow, said selective extension of said towing tongue being provided through apertures located in said tongue and removable pins locatable within said apertures, a tub having side portions to which are mounted a pair of handles, each said handle being selectively longitudinally extensible, each said handle having a distal end with an offset, each said handle being further selectively rotatable about a longitudinal axis, said selective rotation allowing said offset to be located in one of a plurality of different positions wherein said different positions accommodate users of different sizes, said selective extension and rotation of said handles being provided through apertures located in said handles and removable pins locatable within said apertures, said tub having a front portion to which is mounted a second hinge portion, wherein said first and second hinge portions are connected to one another so as to be pivotable about a laterally extending axis of rotation, said tub having a rear portion to which is mounted a removable latching element, wherein said latching element selectively engages said rearward portion of said frame to prevent tilting of the tub with respect to the frame, said tub being pivotable with respect to the frame through an angle of at least 180 degrees forwardly of said frame when said frame is positioned on a ground surface and said latch is disengaged.

* * * * *